United States Patent
Marshall

(10) Patent No.: US 7,316,563 B2
(45) Date of Patent: Jan. 8, 2008

(54) COMBUSTOR WITH INTEGRATED COUNTER-FLOW HEAT EXCHANGER

(76) Inventor: Daniel S. Marshall, 4160 W. Post Rd., Chandler, AZ (US) 85226

( * ) Notice: Subject to any disclaimer, the term of this patent is extended or adjusted under 35 U.S.C. 154(b) by 160 days.

(21) Appl. No.: 10/909,196

(22) Filed: Jul. 30, 2004

(65) Prior Publication Data
US 2006/0021645 A1     Feb. 2, 2006

(51) Int. Cl.
  *F23D 11/44*  (2006.01)
  *F28D 7/00*  (2006.01)
(52) U.S. Cl. ............... 431/243; 431/215; 165/164
(58) Field of Classification Search ............. 431/243, 431/247, 248, 215, 216, 350, 354, 326, 328, 431/11, 207; 136/209; 165/163–166; 432/178, 432/179, 180
See application file for complete search history.

(56) References Cited

U.S. PATENT DOCUMENTS

| | | | | |
|---|---|---|---|---|
| 3,302,683 A | * | 2/1967 | Kemp | .................. 431/215 |
| 3,397,028 A | * | 8/1968 | Brauer | .................. 431/216 |
| 3,525,325 A | * | 8/1970 | Perl | ..................... 431/215 |
| 4,369,029 A | * | 1/1983 | Forster et al. | ............... 432/29 |
| 5,529,484 A | * | 6/1996 | Moard et al. | .............. 431/242 |
| 6,193,501 B1 | * | 2/2001 | Masel et al. | ............... 431/170 |
| 6,613,972 B2 | | 9/2003 | Cohen et al. | |
| 6,840,762 B2 | * | 1/2005 | Maruta et al. | .............. 431/328 |

FOREIGN PATENT DOCUMENTS

DE      27 07 290 A1  *  8/1978
WO   WO 2004/097299 A2  *  11/2004

* cited by examiner

*Primary Examiner*—Josiah C. Cocks
(74) *Attorney, Agent, or Firm*—Parsons & Goltry; Robert A. Parsons; Michael W. Goltry

(57) ABSTRACT

A combustor includes a combustor head with an integrated counter-flow heat exchanger. The combustor head defines a combustion chamber and has a surface accessible for external delivery of thermal energy. The counter-flow heat exchanger has a fuel channel extending between a fuel inlet and a fuel outlet coupled to the combustion chamber, an exhaust channel extending between an exhaust inlet coupled to the combustion chamber and an exhaust outlet, and a shared wall between the fuel channel and the exhaust channel for transfer of thermal energy therebetween.

21 Claims, 2 Drawing Sheets

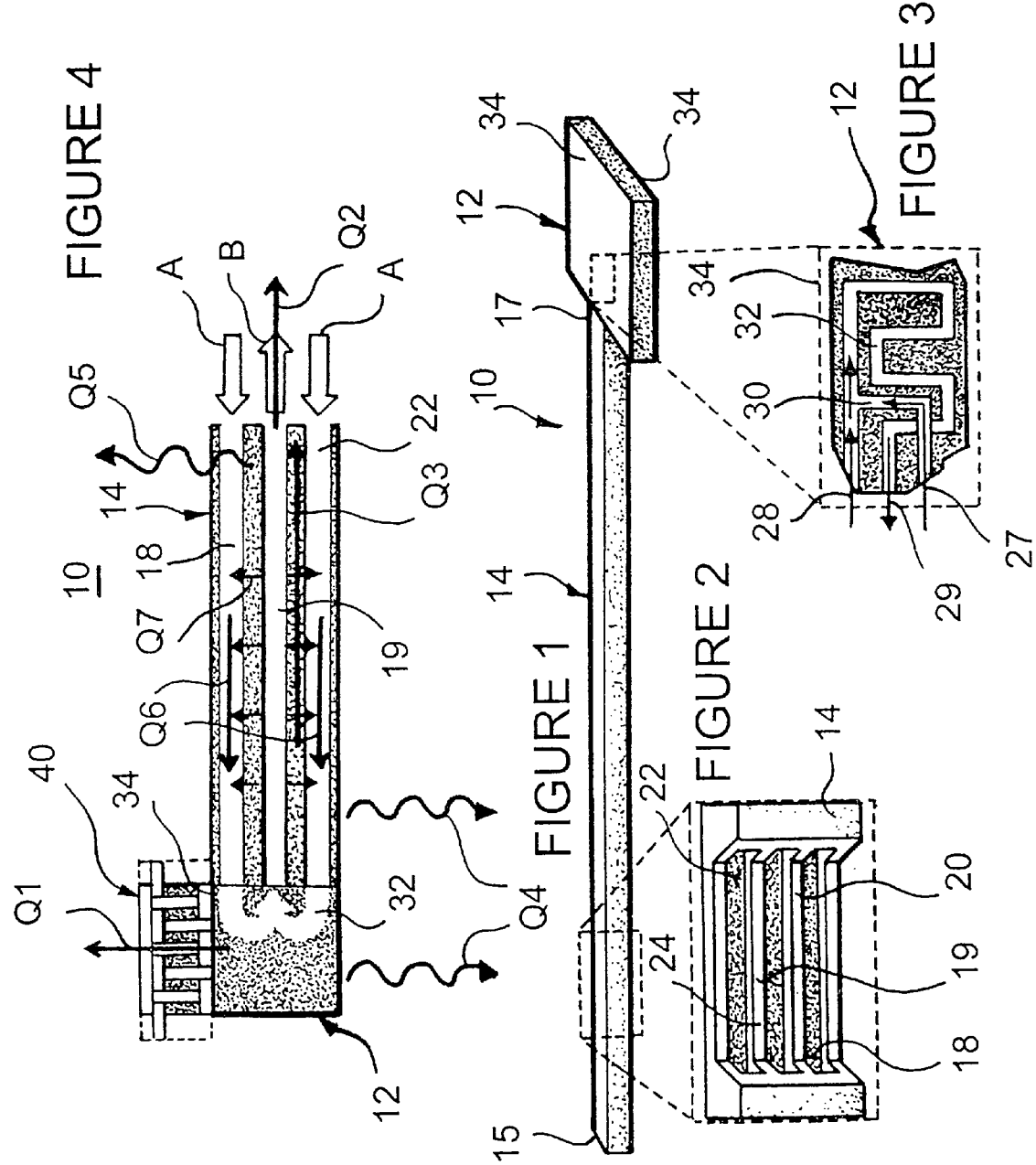

COMBUSTOR WITH INTEGRATED COUNTER-FLOW HEAT EXCHANGER

FIELD OF THE INVENTION

This invention relates to combustion devices.

More particularly, the present invention relates to combustion devices employing heat exchangers.

BACKGROUND OF THE INVENTION

Several problems are prevalent in current combustor technology. Primarily the flaw in current devices is the inefficiency of the process. During combustion, much of the thermal energy produced is dissipated through radiation losses convection losses and, largely, through high temperature exhaust gases exiting the device as a wasted heat. Not only does the heat lost through exhaust gases greatly reduce efficiency, but it also has the potential to be damaging to equipment or surroundings and pose a safety hazard.

Many devices employing combustion as an energy source endeavor to maximize the energy utilized and reduce inefficiencies. Heat engines or other devices utilizing heat for an energy source are often employed in a cascading arrangement in order to utilized escaped thermal energy. As an example, power modules utilizing thermoelectric materials for converting thermal energy to electrical energy have been used by placing multiple modules along the area of thermal loss, namely the exhaust stream. While utilizing thermal energy which would otherwise escape as high temperature exhaust, the cost to power production ratio of the power modules as they progress down the exhaust stream become increasingly high. In other words, a power module has an optimal operating temperature gradient. Less electrical power is generated at the cooler end of the exhaust then at the point of thermal power generation. Each successive module converts less heat flow into electricity and at lower conversion efficiency. The cost of the module may well be more than the value of the power generated.

Another problem with combustion processes at small scales such as are used for providing thermal energy for power modules, is flame quenching due to heat losses with the dimensions of the combustion chamber are very small.

Accordingly, it is an object the present invention to provide a new and improved combustion device.

Another object of the present invention is to provide a more efficient combustion device utilizing in integrated counter-flow heat exchanger.

SUMMARY OF THE INVENTION

Briefly, to achieve the desired objects of the present invention in accordance with a preferred embodiment thereof, provided is a combustor including a combustor head and a counter-flow heat exchanger. The combustor head defines a combustion chamber and has a surface accessible for external thermal delivery. The counter-flow heat exchanger has a first end with an exhaust outlet and a fuel inlet and an opposing end having a fuel outlet and an exhaust inlet. The fuel outlet and the exhaust inlet are in fluid communication with the combustion chamber. A fuel channel extends between the fuel inlet and the fuel outlet and an exhaust channel extends between the exhaust inlet and the exhaust outlet. A shared wall extends between the fuel channel and the exhaust channel for transfer of thermal energy therebetween.

In a further aspect of the present invention, the counter-flow heat exchanger further includes an air inlet at the first end, an air outlet at the second end. The air outlet is in fluid communication with the combustion chamber. An air channel extends between the air inlet and the air outlet. A shared wall extends between the air channel and the exhaust channel for transfer of thermal energy therebetween.

In yet another aspect, at least one of the fuel channel and air channel share a wall with the exhaust channel for transfer of thermal energy therebetween.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is a perspective view of a combustor according to the present invention;

FIG. 2 is an enlarged sectional view of a portion of the counter-flow heat exchanger of the combustor of FIG. 1;

FIG. 3 is an enlarged sectional view of the combustor head of the combustor of FIG. 1;

FIG. 4 is a sectional side schematic of the combustor of FIG. 1;

DETAILED DESCRIPTION OF THE PREFERRED EMBODIMENT

Figure 5:
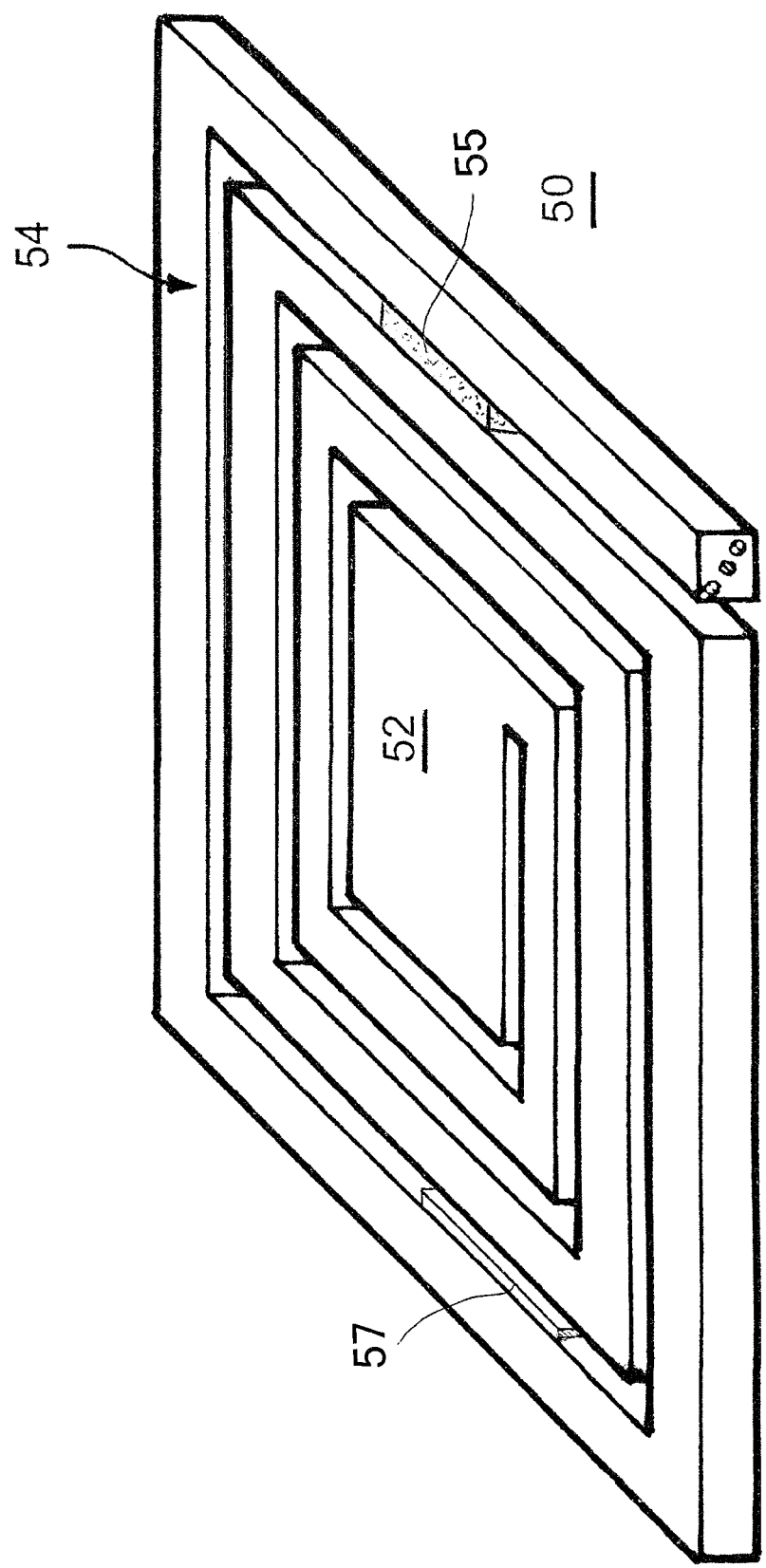
FIG. 5 is a perspective view of another embodiment of a combustor according to the present invention.

Turning now to the drawings in which like reference characters indicate corresponding elements throughout the several views, attention is directed to FIG. 1 which illustrates a combustor generally designated 10. Combustor 10 includes a combustor head 12 and a counter-flow heat exchanger 14. With additional reference to FIG. 2, counter-flow heat exchanger 14 is in the form of an elongated body defining a plurality of channels, or formed of numerous conduits. Combustor 10, and in particular, combustor head 12 is fabricated of materials able to withstand the internally generated temperatures of combustion. For certain applications generating very high temperatures, refractory materials such as aluminum oxide, yttria stabilized zirconia, tungsten and the like can be employed.

In a preferred embodiment, counter-flow heat exchanger 14 includes an end 15 with an exhaust outlet, an air inlet and a fuel inlet, and an opposing end 17 having a fuel outlet, an air outlet and an exhaust inlet. A fuel channel 18 extends between the fuel inlet and the fuel outlet and an exhaust channel 19 extends between the exhaust inlet and the exhaust outlet. A shared wall 20 separates fuel channel 18 from exhaust channel 19 to facilitate transfer of thermal energy therebetween. An air channel 22 extends between the air inlet and the air outlet. A shared wall 24 separates air channel 22 from exhaust channel 19 to facilitate transfer of thermal energy therebetween. Shared walls 20 and 24 extends substantially the entire length of fuel channel 18, exhaust channel 19, and air channel 22, respectively, and act as a counter-flow heat exchanger, as will be described presently. One skilled in the art will understand that, while fuel channel 18 and air channel 22 are employed in the present embodiment, a single channel can be utilized to provide both fuel and oxygen to combustor head 12. In this instance, only two channels or conduits would be employed, those channels or conduits sharing a wall to facilitate transfer of thermal energy therebetween. It will also be understood that at least one of the fuel channel and air channel share a wall with the exhaust channel for transfer of thermal energy therebetween. In Other words, both need not act as a counter-flow heat exchanger with the exhaust conduit. Additionally, as can be seen with reference to FIGS. 2 and 4, the channels or conduits of the present invention are positioned in a vertically stacked arrangement. Fuel channel or conduit 18 is vertically stacked with respect to and contacting exhaust channel or conduit 19. To further improve heat exchange, air channel or conduit 22 can be vertically stacked with respect to and contacting exhaust channel or conduit 19.

Still referring to FIG. 1, with additional reference to FIG. 3, combustor head 12 includes a fuel inlet 27, an air inlet 28, and an exhaust outlet 29. Fuel inlet 27 and air inlet 28 merge at a mixing junction 30. A combustion chamber 32 is defined by combustor head 12 between mixing junction 30 and exhaust outlet 29. As with the previous description of the counter-flow heat exchanger, combustor head 12 can be utilized without an air inlet, and fuel inlet 27 receiving both fuel and air/oxygen. In this instance, a mixing junction between a fuel inlet and air inlet is not required. Opposing end 17 of counter-flow heat exchanger 14 is coupled to combustor head 12 with the fuel outlet of the fuel channel 18, the air outlet of air channel 22 and the exhaust inlet of exhaust channel 19, coupled to fuel inlet 27, air inlet 28, and exhaust outlet 29, respectively. To facilitate combustion of the fuel/air mixture, a catalyst can be deposited on the walls of combustion chamber 32. The catalyst is used to lower the temperature at which the combustion occurs. Substantially any catalyst which lowers the temperature of combustion, or in other words lowers the temperature at which an exothermic oxidizing reaction occurs, can be used. Examples of combustion catalysts used in the preferred embodiment of the present invention include Platinum and iridium.

Various different approaches can be used for igniting combustion in combustor head 12. Combustor head 12 may be heated externally, or an internal heating element, sparking device or the like may be employed within combustion chamber 32. Thus, for example, electric discharge can be employed in combustion chamber 32 or resistive heating can be employed inside or outside combustor head 12

As will become apparent in the continuing description, counter-flow heat exchanger 14 can be formed in various shapes and orientations. In this specific embodiment, counter-flow heat exchanger 14 is a generally linear structure. In each embodiment, however, combustor head 12 includes a surface 34 which is accessible for external thermal energy delivery. Surface 34 is directly couplable or in thermal communication with a load which allows thermal energy generated in combustion chamber 32 to be used.

Turning now to FIG. 4, a schematic side illustration of combustor 10 is illustrated. The operation of combustor 10 is initiated by the injection of cool fuel through fuel channel 18 and cool air through air channel 22 of counter-flow heat exchanger 14 in the direction of arrows A, into combustion chamber 32. The fuel used may be any fuel containing carbon or hydrogen, such as fuel oil, kerosene, butane, propane, alcohol and other hydrocarbons or oxygenated hydrocarbons. Upon initiation of combustion of the air/fuel mix in combustor head 12, hot exhaust is expelled from combustor head 12 through exhaust channel 19 of counter-flow heat exchanger 14 in the direction of arrow B. After the initiation of combustion, hot exhaust gases transfer heat to the incoming fuel and an air. The length of fuel channel 18, exhaust channel 19, and air channel 20 can be adjusted to determine the extent and efficiency of the heat exchange between the hot exhaust and the cool fuel and cool air. Thus, after initiation of combustion, fuel and air extract heat from the exiting exhaust and enter into combustion chamber 32 with a very high temperature. Additionally, the exhaust loses heat to the fuel and air and exits from counter-flow heat exchanger 14 as cool exhaust. In this manner, thermal energy is continually reinserted into combustor head 12 substantially increasing efficiency and maintaining combustion.

After initiation of combustion, the combustion can take place in the gas phase without a flame. The conditions for gas phase combustion are different than those for catalytic or ember induced combustion and also different than those required for a traditional flame. The fuel and air can be pre-heated by counter-flow heat exchanger 14 to such an extent that the gases are compelled to react even if they make contact with the walls which can quench a traditional flame. Exhaust exiting combustor 10 is cool, conserving thermal energy in the device and eliminating hot exhaust which can be detrimental to both efficiency and safety.

Still referring to FIG. 4, heat flows of the device are illustrated by arrows Q1-Q7. The operation of the device is intended to maximize Q1 which is the thermal energy provided to a load through surface 34 by conduction, convection, radiation or any combination of the three. The load utilizing thermal energy may be substantially any heat engine such as a power module 40 utilizing thermoelectric materials. Combustor 10 is capable of delivering heat to any heat engine at high efficiency, resulting in optimal heat delivery to a heat engine so that the heat engine operates at its highest efficiency. Q1 can be increased by maximizing Q6 and Q7, and minimizing Q2-Q5. A high aspect ratio heat exchanger, such as counter-flow heat exchanger 14, minimizes Q3. Adjustment of the length of counter-flow heat exchanger 14 upwardly maximizes Q6 and Q7 while minimizing Q2. Various insulation techniques such as vacuum insulation can be utilized to minimize Q5, and radiation shielding minimizes Q4. By utilizing combustor 10 with sufficient insulation as described, heat energy generated from combustion of fuels in combustor head 12 is continually reinserted into combustor head 12 for use as Q1 at surface 34.

With reference to FIG. 5, another embodiment of a combustor, generally designated 50, is illustrated. Combustor 50 is substantially identical in operation and structure to combustor 10, with the exception of the shape of a counter-flow heat exchanger 54 extending from a combustor head 52. Counter-flow heat exchanger 54 includes conduits or channels for the insertion of air and fuel into combustor head 52 and the elimination of exhaust from combustor head 52. To provide a compact footprint for combustor 50, counter-flow heat exchanger 54 extends from combustor head 52 in a concentric spiral. Thus counter-flow heat exchanger 54 can have substantial length for the efficient exchange of heat as discussed previously, while maintaining a compact shape which does not interfere with a surface 56 accessible for external thermal delivery. It should be noted that the concentric lengths of counter-flow heat exchanger 54 are physically separated by gaps which can include insulation 55 or thermal radiation shielding 57. The isolation of the lengths of counter-flow heat exchanger 54 allows the creation of the sharpest gradient possible for the efficient exchange of heat.

The isolation of lengths of counter-flow heat exchanger 14 occurs simply by the fact that it has a linear shape. Counter-flow heat exchangers having shapes such as that of combustor 50 benefit from the additional consideration of physical separation. For example a counter-flow heat exchanger according to the present invention can be compacted by forming a plurality of switchbacks or serpentine curves. In this case, as in the case of the spiral configuration, various lengths of the counter-flow heat exchanger are separated by insulation, thermal barriers and/or gaps.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A combustor comprising:
    a combustor head having a first surface, a second surface opposing the first surface, a sidewall extending between the first surface and the second surface to fully enclose a combustion chamber therebetween, a fuel inlet and an exhaust outlet formed in the sidewall in communication with the combustion chamber, the first surface and the second surface accessible for external thermal delivery;
    a counter-flow heat exchanger including a body having a fuel conduit extending from the fuel inlet, and an exhaust conduit extending from the exhaust outlet wherein fuel carried by the fuel conduit and exhaust carried by the exhaust conduit flow in essentially opposite directions to each other, the fuel conduit vertically stacked with respect to and contacting the exhaust conduit in thermal communication along substantially the entire length thereof; and
    the body of the counter-flow heat exchanger having a plurality of lengths connected in series, at least one pair of the plurality of lengths being generally parallel with a gap therebetween.

2. A combustor as claimed in claim 1 wherein the plurality of lengths of the body form a concentric spiral with gaps separating generally parallel lengths thereof.

3. A combustor as claimed in claim 1 wherein the gap includes insulation.

4. A combustor as claimed in claim 1 wherein the gap includes thermal radiation shielding.

5. A combustor as claimed in claim 1 wherein the combustor head further includes an air inlet in communication with the combustion chamber, and the body of the counter-flow heat exchanger further includes an air conduit extending from the air inlet wherein air carried by the air conduit and exhaust flow in essentially opposite directions to each other, the air conduit vertically stacked with respect to and contacting the exhaust conduit in thermal communication along substantially the entire length thereof.

6. A combustor as claimed in claim 5 wherein the combustor head further includes a mixing junction between the air inlet and the fuel inlet.

7. A combustor as claimed in claim 1 wherein at least a portion of the combustion chamber is coated with a combustion catalyst.

8. A combustor as claimed in claim 1 wherein the combustor head is fabricated of a refractory material.

9. A combustor comprising:
    a combustor head defining a combustion chamber and having a surface accessible for external thermal delivery;
    a counter-flow heat exchanger including a body having a first end with an exhaust outlet and a first inlet, an opposing end having a first outlet and an exhaust inlet, the first outlet and the exhaust inlet in fluid communication with the combustion chamber, a first channel extending between the first inlet and the first outlet, an exhaust channel extending between the exhaust inlet and the exhaust outlet vertically stacked with respect to the first channel, and a shared wall between the vertically stacked first channel and the exhaust channel for transfer of thermal energy therebetween; and
    the body of the counter-flow heat exchanger having a plurality of lengths connected in series, at least one pair of the plurality of lengths being generally parallel with a physical gap therebetween.

10. A combustor as claimed in claim 9 wherein the plurality of lengths of the body form a concentric spiral with gaps separating generally parallel lengths thereof.

11. A combustor as claimed in claim 9 wherein the gap includes insulation.

12. A combustor as claimed in claim 9 wherein the gap includes thermal radiation shielding.

13. A combustor as claimed in claim 9 wherein the counter-flow heat exchanger further includes a second inlet at the first end, a second outlet at the second end, the second outlet in fluid communication with the combustion chamber, a second channel extending between the second inlet and the second outlet vertically stacked with respect to the first channel and the exhaust channel, and a shared wall between the second channel and the exhaust channel for transfer of thermal energy therebetween.

14. A combustor as claimed in claim 13 wherein the combustor head further includes a mixing junction between the second outlet and the first outlet.

15. A combustor as claimed in claim 9 wherein at least a portion of the combustion chamber is coated with a combustion catalyst.

16. A combustor as claimed in claim 9 wherein the combustor head is fabricated of a refractory material.

17. A combustor as claimed in claim 13 wherein the first conduit carries one of fuel and air and the second conduit carries the other of fuel and air.

18. A combustor comprising:
    a combustor head having a first surface, a second surface opposing the first surface, a sidewall extending between the first surface and the second surface to fully enclose a combustion chamber therebetween, a fuel inlet and an exhaust outlet formed in the sidewall in communication with the combustion chamber, the first surface and the second surface accessible for external thermal delivery; and
    a counter-flow heat exchanger including a body having a fuel conduit extending from the fuel inlet, and an exhaust conduit extending from the exhaust outlet wherein fuel carried by the fuel conduit and exhaust carried by the exhaust conduit flow in essentially opposite directions to each other, the fuel conduit vertically stacked with respect to and contacting the exhaust conduit in thermal communication along substantially the entire length thereof.

19. A combustor as claimed in claim 18 wherein the combustor head further includes an air inlet in communication with the combustion chamber, and the body of the counter-flow heat exchanger further includes an air conduit extending from the air inlet wherein air carried by the air conduit and exhaust flow in essentially opposite directions to each other, the air conduit vertically stacked with respect to and contacting the exhaust conduit in thermal communication along substantially the entire length thereof.

20. A combustor as claimed in claim 18 wherein at least a portion of the combustion chamber is coated with a combustion catalyst.

21. A combustor as claimed in claim 18 wherein the combustor head is fabricated of a refractory material.

* * * * *